United States Patent [19]
Selle

[11] Patent Number: 5,993,320
[45] Date of Patent: Nov. 30, 1999

[54] TEE NUT AND METHOD OF MANUFACTURE

[75] Inventor: Stephen R. Selle, Mentor, Ohio

[73] Assignee: Stafast Products Inc., Painesville, Ohio

[21] Appl. No.: 09/035,341

[22] Filed: Mar. 5, 1998

Related U.S. Application Data

[62] Division of application No. 08/893,463, Jul. 11, 1997.

[51] Int. Cl.⁶ .................................................. B21D 53/24
[52] U.S. Cl. ................................ 470/26; 470/18; 470/25; 72/355.6
[58] Field of Search .................................. 470/18, 20, 21, 470/25, 26, 27, 34; 72/355.2, 355.6

[56] References Cited

U.S. PATENT DOCUMENTS

| | | |
|---|---|---|
| 423,666 | 3/1890 | Bryant . |
| 815,055 | 3/1906 | Weiss . |
| 945,737 | 1/1910 | Anderson . |
| 1,112,525 | 10/1914 | Darling . |
| 1,829,657 | 10/1931 | Jones . |
| 1,850,713 | 3/1932 | Fox . |
| 1,873,894 | 8/1932 | Kimbell . |
| 2,001,144 | 5/1935 | Krnansky . |
| 2,102,558 | 12/1937 | Johnson . |
| 2,286,982 | 6/1942 | Todd . |
| 2,292,239 | 8/1942 | Pierce et al. . |
| 2,583,270 | 1/1952 | Lynall . |
| 2,743,518 | 5/1956 | Zahodiakin . |
| 3,021,537 | 2/1962 | Hughes ..................................... 470/18 |
| 3,079,830 | 3/1963 | Faroni et al. . |
| 3,125,146 | 3/1964 | Rosan . |
| 3,208,135 | 9/1965 | Newbold et al. . |
| 3,281,171 | 10/1966 | Hughes . |
| 3,314,699 | 4/1967 | Taylor . |
| 3,358,727 | 12/1967 | Hughes . |
| 3,432,978 | 3/1969 | Erickson . |
| 3,480,061 | 11/1969 | Leistner . |
| 3,826,206 | 7/1974 | Ruggles . |
| 3,910,331 | 10/1975 | Randall . |
| 4,911,592 | 3/1990 | Muller . |
| 5,238,344 | 8/1993 | Nagayama . |
| 5,348,432 | 9/1994 | Nagayama . |
| 5,429,466 | 7/1995 | Nagayama . |
| 5,501,558 | 3/1996 | Figge et al. ............................ 411/176 |
| 5,503,596 | 4/1996 | Nagayama ................................ 470/20 |
| 5,618,144 | 4/1997 | Leistner . |

FOREIGN PATENT DOCUMENTS 2060368  5/1995  Canada .

OTHER PUBLICATIONS

Patent Specification 1,427,010. Specification published on Mar. 3, 1976. Inventor: Mel Bunker.
Patent Specification 1,025,455. Specification published on Apr. 6, 1966.
Patent Specification 191,416. Specification published on Jan. 15, 1923.
Declaration of Inventor with attached Exhibit A. (2 pages).

*Primary Examiner*—Lowell A. Larson
*Assistant Examiner*—Ed Tolan
*Attorney, Agent, or Firm*—Calfee, Halter & Griswold LLP

[57] ABSTRACT

A Tee nut and method of manufacture is provided which Tee nut includes a flange and a hollow barrel extending from the flange. The flange is general circular and has a pair of pawls extending upwardly therefrom, each of which terminates in teeth for engaging a base member. The barrel has an end portion proximal to the flange and a distal end portion. The proximal end portion has internal female threads and the distal end portion has a smooth unthreaded inner surface. The wall thickness of the distal end portion is thinner than the wall thickness of the proximal end portion, and the outer wall diameter is essentially constant for the length of the barrel. The barrel is formed first as an elongate member extending from a strip of material initially having a constant inner diameter and an outer diameter of the proximal portion greater than the outer diameter of the distal portion, with the distal portion having a wall thickness thinner than the wall thickness of the proximal portion. The outer diameter of the distal portion is increased to the same diameter as the outer diameter of the proximal portion while maintaining the same wall thicknesses of both the distal and proximal portions. The internal surface of the proximal portion is threaded with threads terminating at the distal portion and having a lead angle of at least about 80°. The terminal end surface of the distal portion is essentially planar and parallel to a flange.

7 Claims, 4 Drawing Sheets

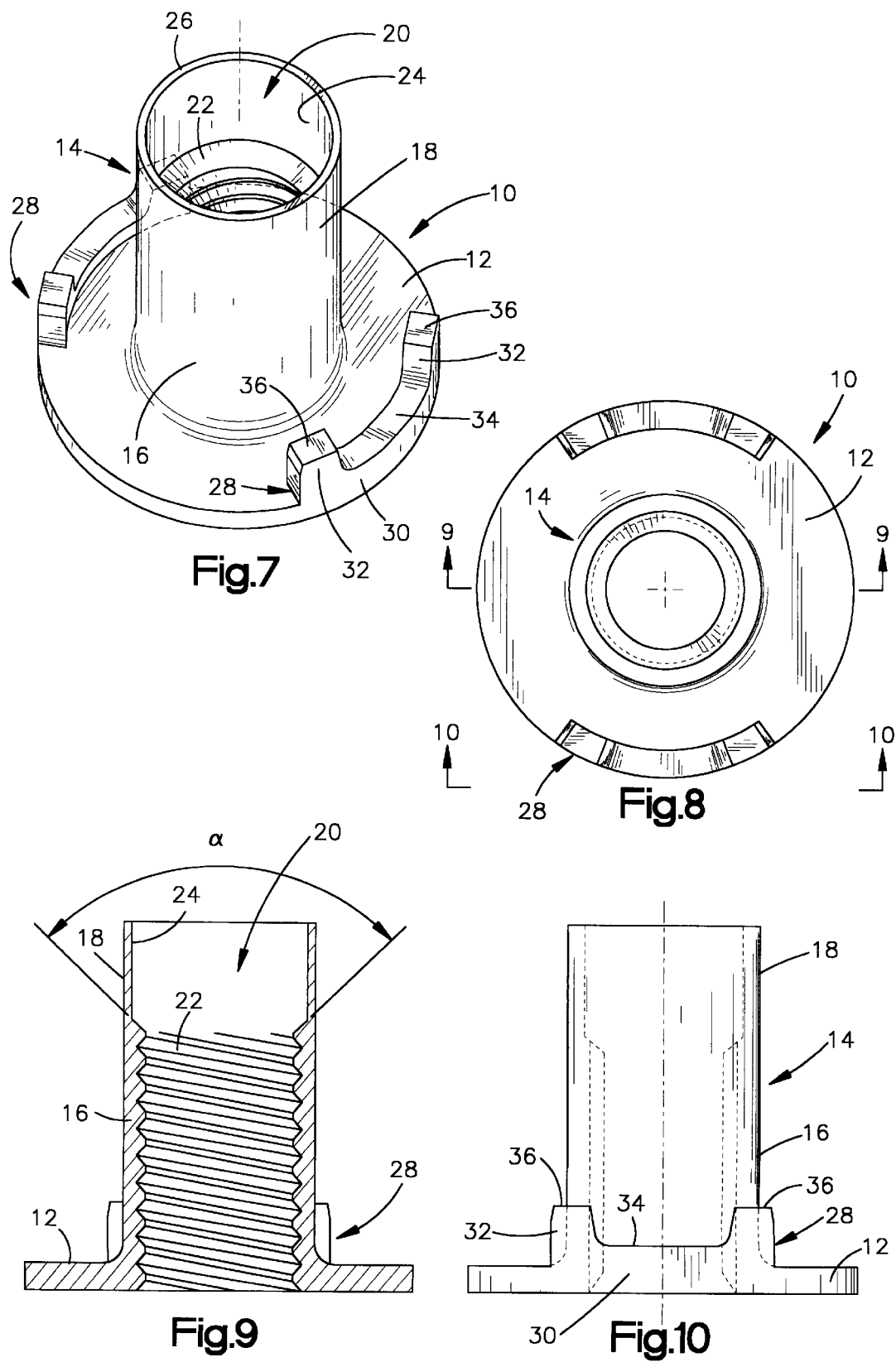

TEE NUT AND METHOD OF MANUFACTURE

CROSS REFERENCE TO RELATED APPLICATIONS

This application is a divisional of Ser. No.: 08/893,463, titled "TEE NUT AND METHOD OF MANUFACTURE", filed Jul. 11, 1997.

BACKGROUND OF THE INVENTION

This invention relates generally to a Tee nut and the method of manufacturing thereof, and more particularly to a Tee nut formed with improved pawls and barrel configuration and method of manufacture thereof to provide improved performance of the nut.

Background Art

The use of Tee nuts as anchors in wood or plastic or composite or other base material into which screws are threaded is well-known in the art. These are especially useful in the manufacturing of furniture. Conventionally Tee nuts include a flange which typically will have pawls extending therefrom to engage the base wood or other material and prevent rotation of the Tee nut and secure the Tee nut in the material. The Tee nut also has an elongate generally cylindrical barrel which is conventionally threaded internally with female threads. In some instances the threading extends only partially within the barrel from the flange at the proximal end portion to the beginning of the distal end portion with the distal end portion being smooth and often having a larger inside diameter than the proximal end portion.

While the pawls may have several different forms e.g. as shown in U.S. Pat. No. 5,503,596 these various pawl forms have limitations or drawbacks either in their effectiveness in holding the Tee nut in place or in the technique of manufacturing the pawls or hampering the feeding of the Tee nuts in automatic feeders.

FIG. 1 shows a side elevational view and FIG. 2 shows a top plan view of one embodiment of a prior art Tee nut and FIG. 3 shows schematically a problem known as shingling encountered when the prior art Tee nuts of FIGS. 1 and 2 are conveyed in a feed track. This shingling occurs when the flange portion of one Tee nut overrides the flange portion of an adjacent Tee nut during feeding thus causing jamming or improper feeding. Moreover, the pawls of the Tee nut shown in FIGS. 1 and 2 while particularly useful for inserting the Tee nut in soft wood, if these types of pawls are used in a plastic or dense wood product, the prongs tend not to penetrate the material but to fold over during insertion. This can cause the part to spin when the bolt is inserted into the part. Thus, the prior art Tee nut of FIGS. 1 and 2 has some significant problems in feeding and is limited in its use.

FIG. 4 is a side elevational view of a another embodiment of a prior art Tee nut and FIG. 5 is a plan view of the Tee nut of FIG. 4. FIG. 6 depicts somewhat schematically a problem encountered when the Tee nut of FIGS. 4 and 5 is utilized in an automatic feed track. As can be seen in FIG. 6, the small upwardly projecting pawl can tend to jam in the feed track thus preventing proper feed of the Tee nut. Moreover, the pawl configuration in the Tee nut of FIGS. 4 and 5 is especially useful in plastic and very dense wood. However, in plywoods or other soft woods this pawl, due to its shape and size, tends to rotate when the bolt is installed. Thus, the prior art Tee nut shown in FIGS. 4 and 5 has limitations in its use and significant drawbacks in its ability to be fed in an automatic feeding track.

Also, the technique of forming the barrel e.g. as shown in U.S. Pat. No. 5,503,596 has several drawbacks and limitations. These includes a shallow, and thus less desirable lead angle, and non-uniform barrel lengths.

SUMMARY OF THE INVENTION

According to the present invention an improved Tee nut is provided which includes a flange and a hollow barrel extending from the flange. The flange is general circular in shape and has a pair of pawls extending upwardly therefrom at spaced locations on the outer periphery of the flange. Each of the pawls terminates in at least two teeth for engaging a base member. The barrel has an end portion proximal to the flange and a distal end portion. The proximal end portion has internal female threads and the distal end portion has an essentially smooth inner surface free of threads. Further, the thickness of the wall of the distal end portion is thinner than the wall thickness of the proximal end portion, and the outer wall diameter is essentially constant for the length of the barrel thus forming the distal end portion with a larger inner diameter and a thinner wall than the threaded proximal end portion of the barrel.

The invention also includes an improved method of forming the barrel section of the Tee nut. The barrel is formed first as an elongate barrel member extending from a strip of material. Thereafter, the barrel is formed to have a constant inner diameter and an outer diameter of the proximal portion greater than the outer diameter of the distal portion, and, with the distal portion having a wall thickness thinner than the wall thickness of the proximal portion. Thereafter, the outer diameter of the distal portion is increased to essentially the same diameter as the outer diameter of the proximal portion while maintaining the same wall thicknesses of both the distal and proximal portions. Thereafter, the internal surface of the proximal portion is threaded with female threads terminating at the distal portion and having a lead angle of at least about 80° and preferably from about 80° to about 100°.

During the forming process of the barrel, the terminal end surface of the distal portion is maintained essentially planar and parallel to a flange to thereby provide a barrel of essentially uniform length around the complete circumference thereof.

DESCRIPTION OF THE DRAWINGS

FIG. 7 is a perspective view of a Tee nut according to the present invention;

FIG. 8 is a top plan view of the Tee nut of FIG. 7;

FIG. 9 is a longitudinal sectional view taken substantially along the plane designated by the line 9—9 of FIG. 8;

FIG. 10 is a side elevational view taken substantially along the plane designated by the line 10—10 of FIG. 8;

DESCRIPTION OF THE PREFERRED EMBODIMENT(S)

Figure 1:
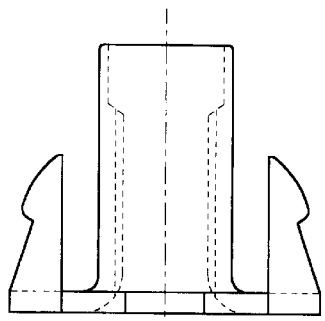
FIG. 1 is a side elevational view of one embodiment of a prior art Tee nut.
Figure 2:
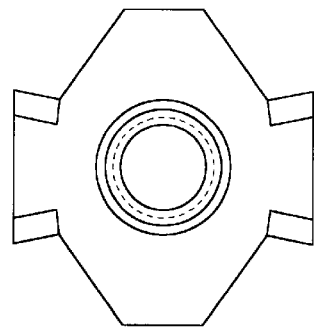
FIG. 2 is a top plan view of the Tee nut of FIG. 1.

Referring now to the drawings and to the present to FIGS. 7 through 10, a Tee nut designated generally as 10 according to the present invention is shown. The Tee nut 10 includes a generally circular flange 12 and a barrel 14 extending upwardly from the flange 12. (The direction "upwardly" as used herein is to designate the direction as depicted in the drawings, it being understood that the Tee nut can be oriented in any direction in use.) The flange 12 is generally planar and the barrel 14 extends generally perpendicular from the flange. The barrel 14 has an end portion 16 proximal to the flange 14 and a distal end portion 18. The barrel 14 also has a through central bore 20. The external diameter of the barrel 14 is essentially constant throughout its entire length.

The proximal end 16 of the barrel 14 has female threads 22 extending essentially from the flange to the beginning of distal end 18. The distal end 18 has a smooth internal surface 24 and terminates in an end wall 26. The end wall 26 is essentially planar and parallel to the flange 12 thus providing a barrel which has a constant length around its circumference. The wall thickness of the distal end portion 18 is substantially thinner than the wall thickness of the proximal end portion 16 and at the transition between the threaded portion 22 and the smooth portion 24 at the beginning of the threads forms a lead angle designated as $\alpha$. The lead angle $\alpha$ is at least about 80° and preferably from about 80° to about 100°. The purpose of such particular angle is to assure the proper entry of a screw into the threaded portion as will described presently.

Figure 3:
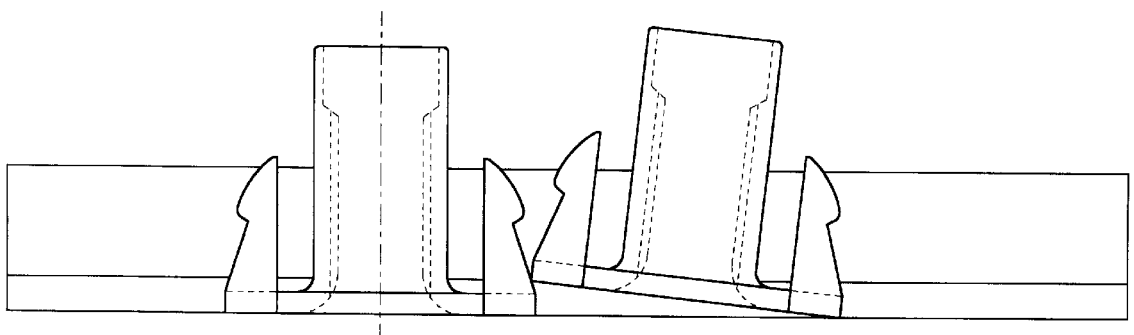
FIG. 3 is a diagrammatic depiction of a malfunction known as shingling when the Tee nuts shown in FIGS. 1 and 2 are utilized in a feed track for automated machinery.
Figure 4:
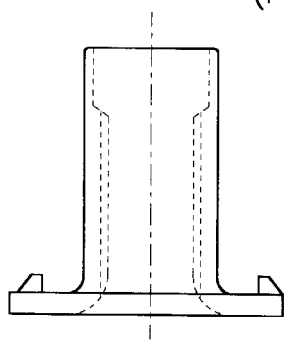
FIG. 4 is a side elevational view of another prior art embodiment of a Tee nut.
Figure 5:
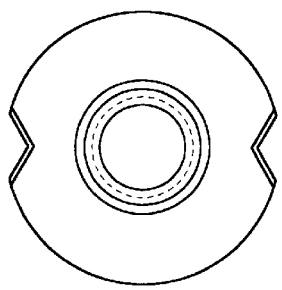
FIG. 5 is a top plan view of the Tee nut of FIG. 4.
Figure 6:
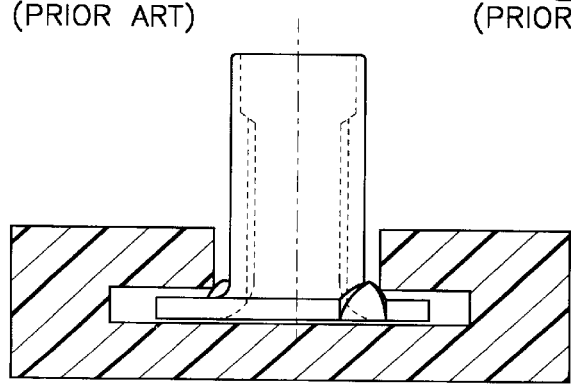
FIG. 6 is a diagrammatic representation of a condition resulting in jamming when the Tee nut of FIGS. 4 and 5 is utilized in a feed track for automated machinery.

A pair of pawls 28 are provided which extend upwardly from the flange 12 generally parallel to the barrel 14 and preferably are spaced at opposite sides from each other on the flange 12. Each of the pawls 28 includes a base portion 30 with a pair of teeth 32 projecting upwardly therefrom. The teeth are interconnected by a flat interconnecting surface 34, and each of the teeth terminates generally in a flat end 36. The pawls 28 are formed when the flange 12 is formed and are co-planar therewith. They are then bent up to the position as shown in the drawings, thus assuring a flange which is essentially round. With the design of the pawls 28 and the flange 12 the shortcomings of the prior art Tee nuts shown in FIGS. 1 & 2 and 4 & 5 are overcome. First the design of the pawl 28 allows the Tee nut to be used both on relatively soft wood such as plywood as well as hard wood and plastic. This allows the pawls 28 to be inserted into the body of either hard or soft wood or plastic and resist spinning in either type of body. Moreover, the design of the flange 12 and pawls 28 essentially eliminates the problems of shingling as shown in FIG. 3 with the prior art Tee nut of FIGS. 1 and 2 and jamming as shown in FIG. 6 with the prior art Tee nuts of FIGS. 4 and 5.

Figure 11:
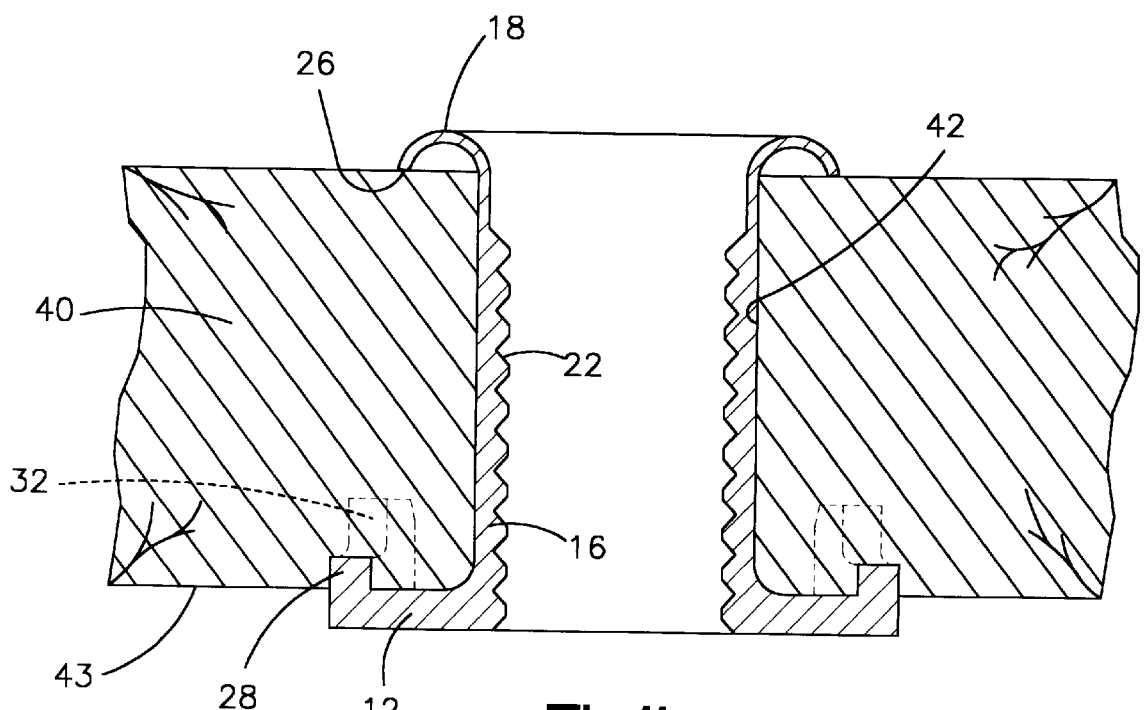
FIG. 11 is a longitudinal sectional view of the Tee nut of FIGS. 1 through 4 inserted into a part with the terminal end of the distal portion crimped over.

The Tee nut 10 as it is utilized in a part for securing a screw is shown in FIG. 11. As shown in FIG. 11 a portion of a wood or composite or plastic member 40 is shown having a through central bore 42. The central bore 42 has essentially the same diameter as the outer diameter as the barrel 14. In a well-known manner the barrel 14 is inserted into the bore 42 and the pawls 28 driven into the member 40 until the flange 12 abuts face 43 of the member 40 as shown in FIG. 11. The length of the barrel 14 is selected such that it is somewhat longer than the length of the bore 42 and the distal end 18 is crimped over as shown in FIG. 5 in a well known manner. In order to have the crimp effective it is essential that the end wall 26 be substantially parallel to the flange 12 such that the length of the barrel is the same around its entire circumference. If there is substantial difference in that the one side of the barrel is significantly too short or too long that side will not crimp properly and thus the Tee nut will not be restrained in the bore properly for the reception of the screw. Moreover, if there is variance of the length of the barrel from side to side when the distal end is crimped over cracking can occur.

It should also be understood that in some instances where the Tee nut is used, the end of the barrel terminates within the central bore 42. In such case the distal portion 18 be flared out in a well known manner.

Also as indicated earlier the lead angle $\alpha$ should be at least about 80° and preferably between about 80° and about 100°. If the angle is shallower or less than about 80° there is a tendency for the screw that is threaded therein to miss thread or cross-thread or come in at an angle and thus not provide the proper threaded fit between the screw and the threads 22. This is due to the fact that with an angle of less than about 80° the initial part of the thread encountered by the screw is a relatively low percentage of the thread (i.e. less than about one half of the full thread height) thus causing a misthreading. On the other hand, it is difficult to manufacture an angle $\alpha$ greater than about 100°.

Figure 12:
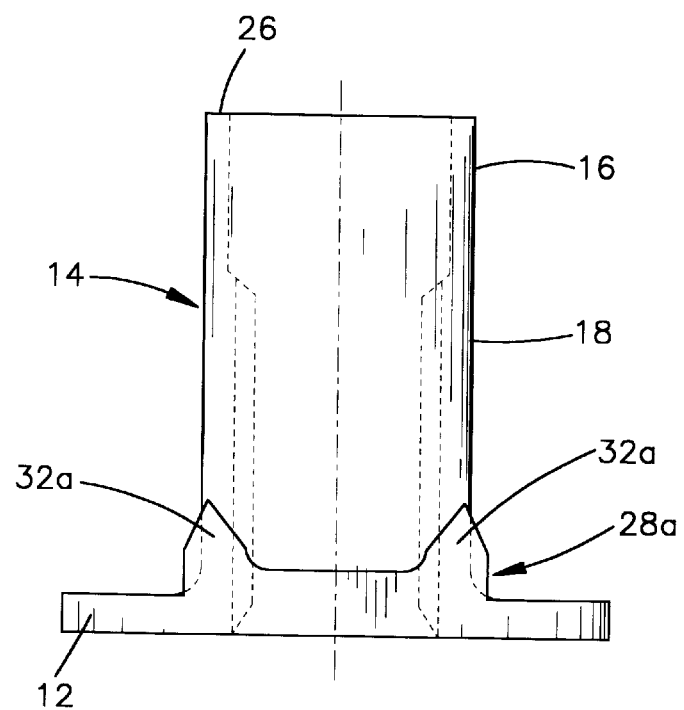
FIG. 12 is a side elevational view of another embodiment of a T-nut according to this invention.

Referring now to FIG. 12, another embodiment of the Tee nut according to this invention is shown. In this embodiment pawls 28a are formed with teeth 32a that are pointed rather than flat at the top. This will make the pawls somewhat easier to insert, but which still will not bend with hard wood or plastic.

Figure 13:
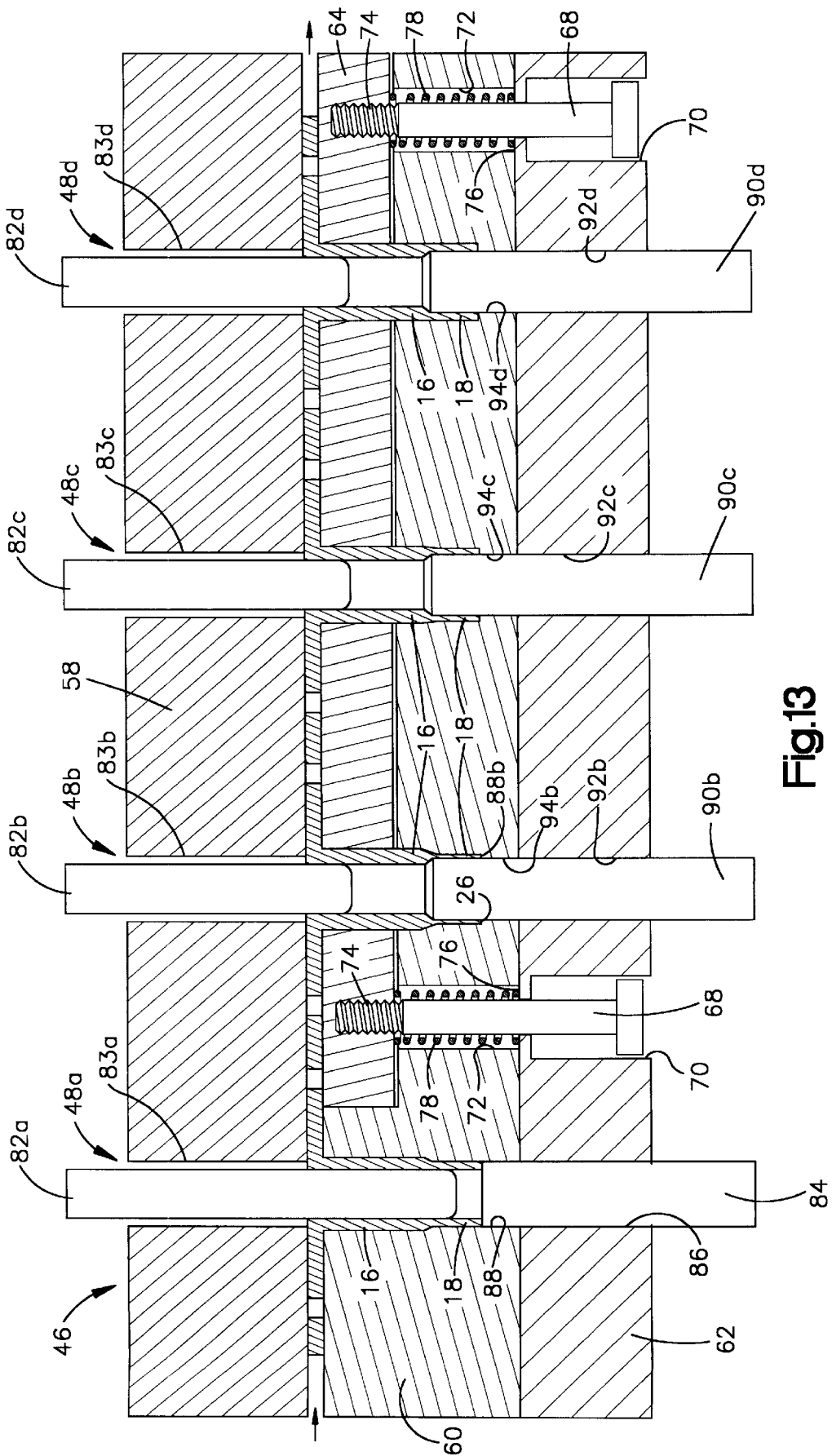
FIG. 13 is a longitudinal sectional view, somewhat diagrammatic of four stations of a progressive die showing the formation of the barrel of the Tee nut according to the present invention.

Referring now to FIG. 13 various stations of a progressive die 46 are shown together with how they form the shape of the barrel 14. Prior to the stations in FIG. 13 the formation of the Tee nut with the flange and the barrel in rough form are conventional such as shown in U.S. Pat. No. 5,503,596.

As shown in FIG. 13 four stations 48a, 48b, 48c, and 48d for forming the barrel into its final shape (except for the threads) are shown. The strip with a barrel formed thereon of uniform wall thickness (not shown) formed in a conventional manner is moved from left to right as shown in FIG. 13. At the first station 48a the distal portion of 18 of the barrel 14 is formed to have a smaller outer diameter than the proximal portion 16 while maintaining a constant inner diameter for the entire length of the barrel as shown in station 48a. This means the wall thickness at the distal portion 18 is thinner than the wall at the proximal portion 16.

At station 48b the first stage of expanding the outer diameter of the distal portion 18 is performed while maintaining the wall thicknesses of both the distal portion and the proximal portion. Station 48c continues expanding the outer diameter of the distal portion 18 and at station 48d the expanding operation is completed to form the final Tee nut having the flange 12 and barrel 14 ready for threading. The strip is moved from left to right moving the barrel 14 successively from station 48a to station 48b to station 48c to station 48d and then finally from the die set in a conventional manner.

The die 46 includes an upper die 58, a lower die 60 and a base plate 62. A stripper plate 64 is provided which is secured to the lower die 60 by means of stripper bolts two of which are shown at 68 which bolt 68, each pass through opening 70 in the base plate 62 opening 72 in lower die 60 and threads into opening 74 in the stripper plate 64. Shoulders 76 are formed on the lower die 60, and the springs 78 are disposed in openings 72 abutting against the shoulders 76 and the lower portion of stripper plate 64. (The stripper plate 64 is actually formed in two sections only one of which is shown to provide a longitudinal path for the barrel during movement from station to station.)

A plurality of pilots 82a, 82b, 82c, and 82d are provided, one at each station which extend through openings 83a, 83b, 83c, and 83d in the upper die 58. A knock-out pin 84 is provide which extends through opening 86 in the base plate 62 and opening 88 in the lower die 60. Bottom punches 90b, 90c, and 90d extend through openings 92b, 92c, and 92d respectively in base plate 62 and openings 94b, 94c and 94d respectively in lower die 60.

The operation of the progressive die is as follows:

A strip with a barrel partially formed thereon moves from left to right as seen in FIG. 13, and the barrel is formed progressively to its final shape in stations 48a through 48d. The operation of each station will be described successively, it being understood that the forming operations are being carried out at the stations simultaneously in the progressive die 48.

The barrel 14 received from the previous station, (not shown), has a constant wall thickness slightly larger than the final thickness of the proximal end portion 16 and a length slightly less than the desired final length and is inserted into the lower die 60 at station 48a. The knock-out pin 84 is inserted into the openings 86 and 88 such that the end of the pin 84 is spaced from the top of the inner die 60 at a distance equal to the desired final length of the barrel 14. The upper die 58 is then closed and the pilot 82a is driven internally into the central bore of the barrel 14 which causes the barrel 14 to be formed with a distinct proximal end portion 16 and a distinct distal end portion 18 of different wall thickness each being close to equal to the desired final wall thickness of the respective portion of the barrel. (There may be some slight thinning of these walls during later operations.) The outer diameter of the proximal end portion 16 is equal to the desired final outer diameter. Hence, the outer diameter of the distal portion 18 is less than the desired, final outer diameter thereof which desired final outer diameter is equal to the outer diameter of the proximal end 16, so that the outer diameter of the barrel 14 over its entire length in the final form is uniform.

The strip with the barrel formed as shown in FIG. 48a is then moved to section 48b. This is accomplished by raising the upper die 58 and raising the knock-out pin 84 to move the bottom of the barrel flush with the top of the lower die 60.

Also, the action of the bolts 68 and springs 78 causes the stripper plate to move up stripping the strip with a barrel in the varying stages from the lower die. When the limit of movement of the stripper plate is reached by bolts 68 abutting the bottom of the openings 70, the stripper plate will stop its upward movement. As indicated earlier, the stripper plate 64 is actually formed in two sections (a left and right section) which leaves an opening there between (not shown) which allows the barrels to move to the next station. Of course the pilots 82 have been withdrawn into the upper die to allow movement of the strip with the partially formed barrels.

As each partially formed barrel moves to the next stage, the upper die 58 is again closed. At station 48b this forces the end of the distal portion 18 against shoulder 88b in the lower die and the action of the bottom punch 90b serve to start expanding the outer diameter and the inner diameter of distal section 18 of the barrel 14 while maintaining the wall thickness thereof with the pilot 82b acting as a guide. This will also assure that the end 26 is parallel to the flange 12. At station 48c the barrel which has been partially formed at station 48b is formed further to a point where the outer diameters of the distal portion 18 and proximal portion 16 are approximately equal, and the inner diameter of the distal portion 18 is substantially larger than the inner diameter of the proximal portion 16, with the wall thickness of the distal portion 18 still remaining the same. At station 48d the final sizing and shape of the barrel takes place after which the strip with the formed barrel 14 is moved from the die.

Thereafter, the shape of the pawls is cut, the pawls are bent up, and then the part is severed from the strip as is well known in the art.

When formed according to the present invention as shown in FIG. 13, the end wall 24 of the distal portion 18 is essentially flat and parallel with the flange 12 and thus the length of the barrel 14 is uniform around its entire circumference which thus aids in the crimping operation to provide better holding as described previously. Moreover, when formed according to the present invention the lead angle α as previously described can be precisely controlled to be between about 80° and about 100° by controlling the shape of the end of the bottom punches 90b, 90c, and especially 90d.

Accordingly, the preferred embodiment of the present invention has been described. With the foregoing description in mind, however, it is understood that this description is made only by way of example, that the invention is not limited to the particular embodiments described herein, and that various rearrangements, modifications, and substitutions may be implemented without departing from the true spirit of the invention as hereinafter claimed.

What is claimed is:

1. In a method of forming a Tee nut having a flange and a barrel extending from said flange, and wherein said barrel has a central opening extending through said flange, said barrel being formed by steps comprising, (a) forming an elongate barrel member extending from said flange and having a portion proximal to said flange and a distal portion, (b) said barrel being formed in a first step having essentially uniform proximal and distal portion inner diameters, and a proximal portion outer diameter greater than a distal portion outer diameter, (c) thereafter increasing the distal portion outer diameter to essentially the proximal portion outer diameter, while maintaining essentially the same wall thickness of said distal portion; and (d) actuating a tool against the distal portion inner diameter to form a lead angle of between 80° and about 100° between said distal portion inner diameter and said proximal portion inner diameter; and (e) threading said proximal portion inner diameter with female threads.

2. The invention as defined in claim 1 wherein increasing the distal portion outer diameter is done in multiple steps.

3. A method of manufacturing a Tee nut having a flange and a barrel extending from said flange, and wherein said barrel has a central opening extending through said flange and a portion proximal to said flange and a distal portion, said barrel being formed by steps comprising, (a) forming a barrel member having a proximal portion outer diameter being greater than a distal portion outer diameter and essentially uniform proximal and distal portion inner diameters, (b) increasing the distal portion outer diameter to essentially the proximal portion outer diameter, while maintaining essentially the same wall thickness of both the distal and proximal portions; and (c) actuating a tool against the distal portion inner diameter to form a lead angle of between 80° and about 100° between said distal portion inner diameter and said proximal portion inner diameter; and (d) threading said proximal portion inner diameter internally with female threads.

4. The method of manufacturing a Tee nut in accordance with claim 3, wherein said step of forming said lead angle comprises the step of actuating a bottom positioned tool against the distal portion inner diameter.

5. The method of manufacturing a Tee nut in accordance with claim 3, wherein increasing the distal portion outer diameter is done in multiple steps.

6. The method of manufacturing a Tee nut in accordance with claim 1, wherein said step of forming said lead angle comprises the step of actuating a bottom positioned tool against the distal portion inner diameter.

7. A method of manufacturing a Tee nut having a flange and a barrel extending from said flange, and wherein said barrel has a central opening extending through said flange and a portion proximal to said flange and a distal portion, said barrel being formed by steps comprising, (a) forming a barrel member having a proximal portion outer diameter being greater than a distal portion outer diameter and essentially uniform proximal and distal portion inner diameters, (b) increasing the distal portion outer diameter to essentially the proximal portion outer diameter, while maintaining essentially the same wall thickness of both the distal and proximal portions; and (c) actuating a tool against the distal portion inner diameter to form a lead angle between said distal portion inner diameter and said proximal portion inner diameter; and (d) threading said proximal portion inner diameter internally with female threads.

* * * * *